United States Patent
Lee

(10) Patent No.: US 10,361,163 B2
(45) Date of Patent: Jul. 23, 2019

(54) CIRCUIT AND METHOD FOR DETECTING TAMPERING OR PREVENTING FORGERY OF SEMICONDUCTOR CHIP

(71) Applicant: Magnachip Semiconductor, Ltd., Cheongju-si (KR)

(72) Inventor: Yong Sup Lee, Cheongju-si (KR)

(73) Assignee: MagnaChip Semiconductor, Ltd., Cheongju-si (KR)

(*) Notice: Subject to any disclaimer, the term of this patent is extended or adjusted under 35 U.S.C. 154(b) by 417 days.

(21) Appl. No.: 15/137,411

(22) Filed: Apr. 25, 2016

(65) Prior Publication Data
US 2016/0314320 A1    Oct. 27, 2016

(30) Foreign Application Priority Data

Apr. 23, 2015  (KR) .................. 10-2015-0057234

(51) Int. Cl.
| | |
|---|---|
| *G06F 21/82* | (2013.01) |
| *H01L 23/00* | (2006.01) |
| *G06F 21/75* | (2013.01) |
| *G06F 21/86* | (2013.01) |

(52) U.S. Cl.
CPC ............ *H01L 23/576* (2013.01); *G06F 21/75* (2013.01); *G06F 21/86* (2013.01)

(58) Field of Classification Search
CPC .................................. G06F 21/75; G06F 21/86
See application file for complete search history.

(56) References Cited

U.S. PATENT DOCUMENTS

| | | | |
|---|---|---|---|
| 6,745,331 B1* | 6/2004 | Silverbrook ............ G06F 21/31 347/10 |
| 8,789,200 B2 | 7/2014 | An et al. | |
| 2009/0328218 A1* | 12/2009 | Tsurukawa .............. G06F 21/64 726/23 |
| 2010/0058077 A1* | 3/2010 | Matsuda ................. G06F 21/78 713/194 |
| 2010/0187527 A1* | 7/2010 | Van Geloven ........ H01L 23/576 257/48 |
| 2014/0250541 A1* | 9/2014 | A/L Krishnasamy .. G06F 21/86 726/34 |
| 2015/0146466 A1* | 5/2015 | Kim ...................... H02M 7/219 363/127 |

FOREIGN PATENT DOCUMENTS

KR    10-1042349 B1    6/2011

* cited by examiner

*Primary Examiner* — Oleg Korsak
*Assistant Examiner* — Devin E Almeida
(74) *Attorney, Agent, or Firm* — NSIP Law

(57) ABSTRACT

A circuit for preventing forgery of semiconductor chip includes a driving signal protection unit and a control unit. The driving signal protection unit configured to include at least one protection wire protecting a driving wire having driving signals flow therethrough. The control unit configured to generate a first security code and a second security code. The control unit is further configured to compare the first security code that passes through the driving signal protection unit and the second security code that bypasses the driving signal protection unit to detect tampering at the at least one protection wire, and to control operation of the semiconductor chip.

19 Claims, 14 Drawing Sheets

CIRCUIT AND METHOD FOR DETECTING TAMPERING OR PREVENTING FORGERY OF SEMICONDUCTOR CHIP

CROSS-REFERENCE TO RELATED APPLICATIONS

This application claims the benefit under 35 USC 119 of Korean Patent Application No. 10-2015-0057234, filed on Apr. 23, 2015, in the Korean Intellectual Property Office, the entire disclosure of which is incorporated herein by reference for all purposes.

BACKGROUND

1. Field

This disclosure relates to a driving technology of a circuit for detecting tampering or preventing forgery of a semiconductor chip, such as, to a circuit and method for detecting tampering or preventing forgery of a semiconductor chip that uses a protection wire and security code transmitted through a security wire to prevent the forgery of a driving signal in a semiconductor chip.

2. Description of Related Art

Manufacturing and driving technologies of a semiconductor chip are rapidly being developed in the IT industry. Development of highly efficient chips is currently ongoing in a fiercely competitive landscape to determine a market leader. Rival companies seek to reverse engineer competitors' semiconductor chips using a variety of technologies including DECAP technology, which can be used to expose the silicon die from its package. The exposed silicon die usually can provide insight into the technology used and can be probed to acquire the driving technology through real-time monitoring of an exposed wire.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a circuit for preventing forgery of semiconductor chip includes a driving signal protection unit and a control unit. The driving signal protection unit configured to include at least one protection wire protecting a driving wire having driving signals flow therethrough. The control unit configured to generate a first security code and a second security code. The control unit is further configured to compare the first security code that passes through the driving signal protection unit and the second security code that bypasses the driving signal protection unit to detect tampering at the at least one protection wire, and to control operation of the semiconductor chip.

The control unit may include a security code generation module that is configured to generate the security code consisting of at least one bit.

The control unit may include a compare module that configured to check whether the first and second security codes match.

The compare module may prevent a leakage current and stabilize the first security code when an induced change is generated at the protection wire.

The compare module may assign a value that is different from a corresponding bit of the second security code to a corresponding bit of the first security code transmitted by the changed protection wire when the induced change is generated at the protection wire.

The control unit may generate the security code until the induced change of the protection wire is detected and repeatedly perform a process of comparing the first and second security code.

The control unit may include an operation control module configured to determine whether the semiconductor chip operates based on the first and second security codes.

The operation control module may perform a predetermined operation that is different from an operation by the driving signal when the first and second security codes do not match.

The operation control module may stop an operation of the semiconductor chip when the first and second security codes do not match.

The protection wire may be disposed adjacent to the driving wire.

The security code generation module may generate the security code such as a random code, a gray code, an add code, a reduce code or a cipher code according to a desired level of security.

The security code generation module may change a type of the generated security code based on predetermined condition while the semiconductor chip operates.

A security code transformation unit may be configured to transform the security code generated in the security code generation module.

In another general aspect, a method for preventing forgery of semiconductor chip includes using at least one protection wire to protect a driving wire having driving signals flow therethrough. The method also generates a first security code and a second security code and compares the first security code passing though the protection wire and the second security code bypassing the protection wire to detect tampering that causes an induced change in the at least one protection wire, and to control an operation of a semiconductor chip.

The method may transform the generated security code, provide the transformed security code to the protection wire and bypass the transformed security code.

In another general aspect, a circuit for preventing of semiconductor chip includes an operation control module, a security code generation module, a driving signal protection unit, and a compare module. The operation control module is configured to control the operation of the semiconductor chip. The security code generation module is coupled to the operation control module. The security code generation module creates a security code and copies of the security code. The driving signal protection unit receives a first copy of from the security code generation module. A second copy of the security code is driven to bypass the driving signal protection unit. The compare module is coupled to the operation control module and the driving signal protection unit. The compare module receives and compares both the first copy of the security code from the driving signal protection unit and the second copy of the security code from the security code generation module. The operation control module detects tampering when the first copy of security code does not match the second copy of the security code.

The driving signal protection unit may include driving wires carrying data and protection wires. The protection wires are configured to break when physically touched.

The protection wires may be disposed around the driving wires.

Tampering may cause an induced change of at the at least one protection metal line wire.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF THE DISCLOSURE

Figure 1A:
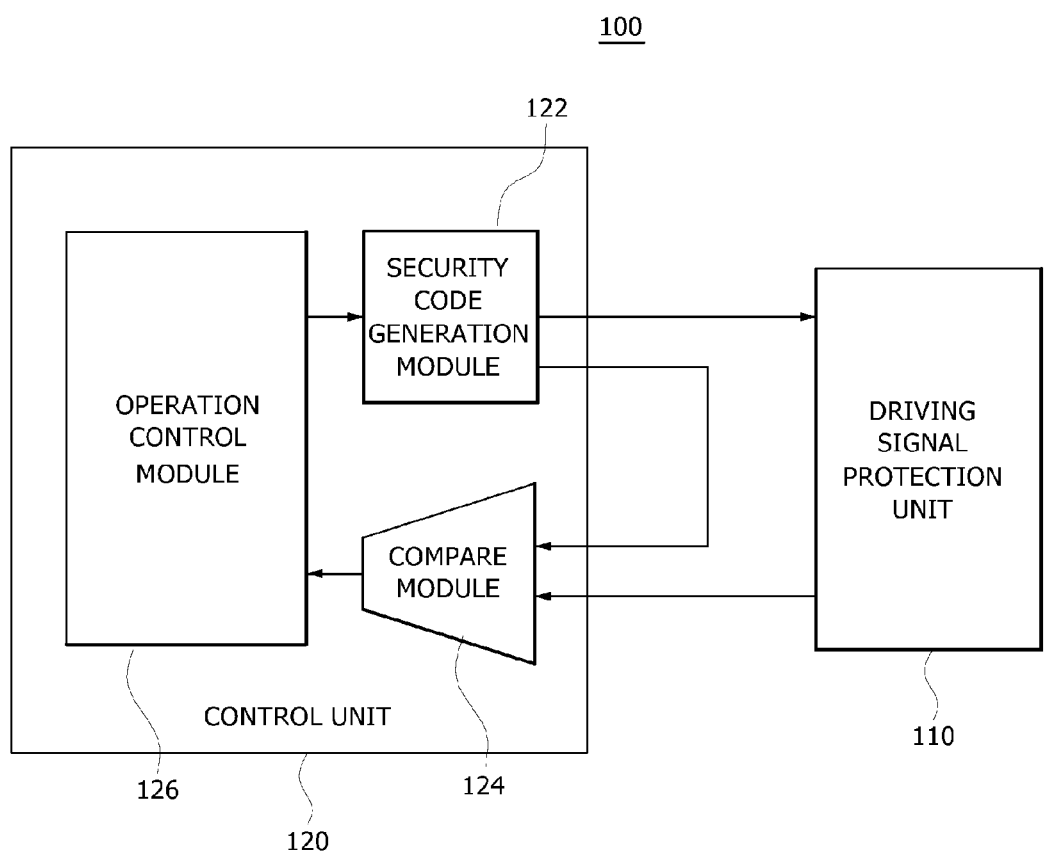
FIGS. 1A and 1B are circuit diagrams illustrating circuits for detecting tampering and preventing forgery of semiconductor chip.

The following detailed description is provided to assist the reader in gaining a comprehensive understanding of the methods, apparatuses, and/or systems described herein. The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Various changes, modifications, and equivalents of the systems, apparatuses and/or methods described herein will be apparent to one of ordinary skill in the art. Moreover, it is noted that like reference numerals represent similar parts throughout the several views of the drawings.

While terms such as "first," "second," and the like, may be used to describe various components, such components must not be understood as being limited to the terms. The terms are merely used to help the reader to distinguish one component from another.

Singular forms "a", "an" and "the" in the present disclosure are intended to include the plural forms as well, unless the context clearly indicates otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Existing technologies include a sensor unit that measures physical changes in surrounding environment data, a storage unit that stores initial surrounding environment data measured by the sensor unit, and a control unit that compares measured surrounding environment data and initial surrounding environment data to determine whether tampering is detected in the semiconductor chip. However, the inclusion sensors for acquiring surrounding environment data and their respective driving circuit increases the complexity, circuit area, and cost needed to implement the solution.

According to a general aspect, a circuit and method for preventing a forgery of a semiconductor chip may not use a sensor unit for acquiring surrounding environment data and a storage unit for storing initial surrounding environment data of a semiconductor chip to detect tampering or prevent a forgery in respect of a driving signal of a semiconductor chip.

Figure 1B:
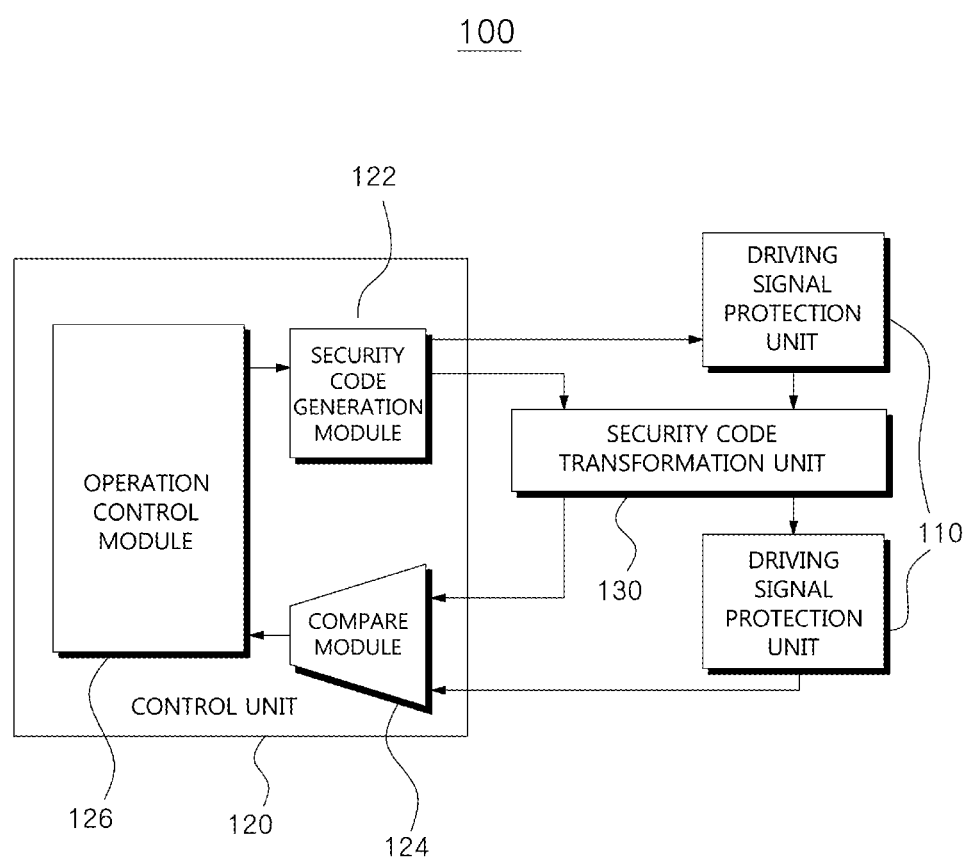
Figure 2A:
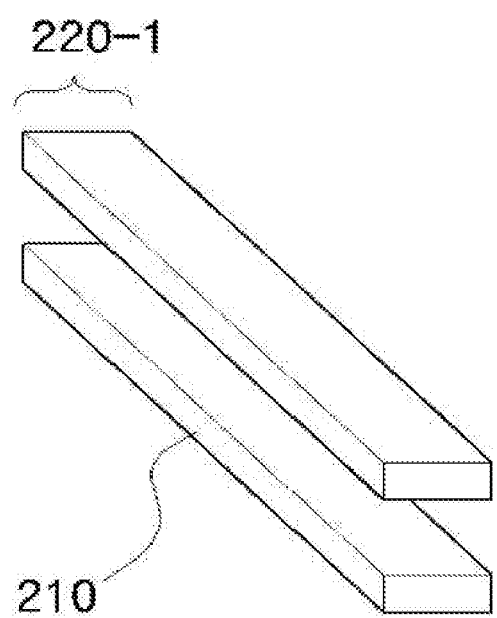
FIGS. 2A and 2B are drawings illustrating an example of a driving signal protection unit.
Figure 2B:
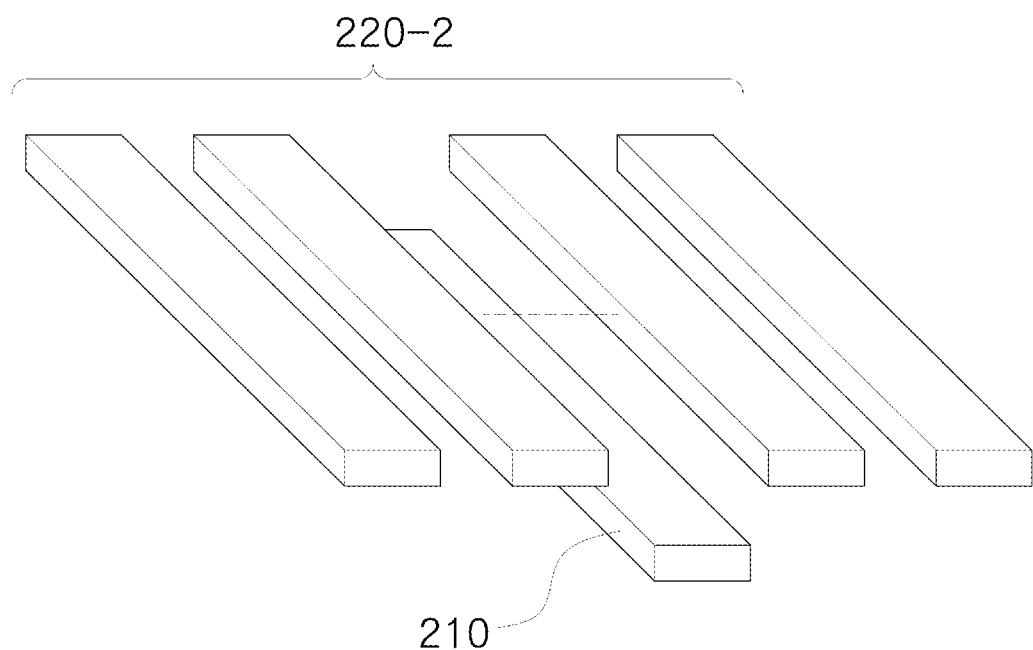
Figure 3A:
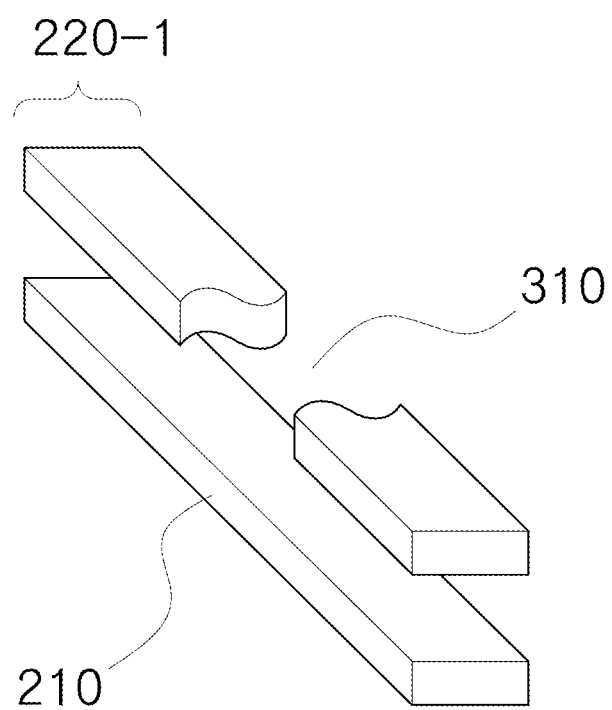
FIGS. 3A and 3B are drawings illustrating an induced change generated in a protection wire of an example of a driving signal protection unit.
Figure 3B:
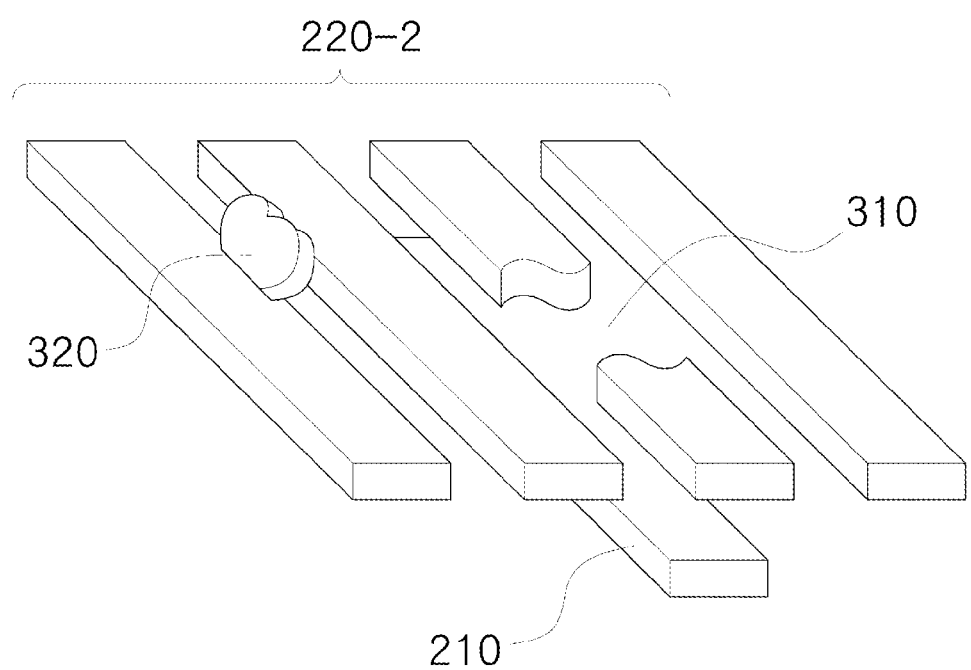

FIGS. 1A and 1B are circuit diagrams illustrating examples of circuits for detecting tampering and preventing forgery of semiconductor chip. FIGS. 2A and 2B are drawings illustrating examples of driving signal protection units. FIGS. 3A and 3B are drawings illustrating changes that an induced change generates in a protection wire of an example of a driving signal protection unit.

Referring to FIG. 1A, a circuit for preventing forgery of semiconductor chip 100 includes a driving signal protection unit 110 and a control unit 120. Referring to FIG. 1B, the circuit for preventing forgery of semiconductor chip 100 may further include a protection code transformation unit 130.

Referring to FIGS. 2A and 2B, the driving signal protection unit 110 includes a driving wire 210 and a protection wire 220.

The driving signal protection unit 110 includes at least one protection wire 220 protecting the driving wire 210 that a driving signal flows through. The driving signal may represent a set of instructions and/or data. The driving signal protection unit 110 may include a protection wire 220 that is opposingly and/or adjacently disposed to the driving wire 210 so as to protect the driving wire 210. The protection wire 220 may protect the driving wire 210 from a probing technology by inhibiting physical access to the driving wire 210 such as shown in FIG. 2A where the protection wire 220-1 is disposed above the driving wire 210. In instances where a probing technology is used to probe the driving wire 210 of the semiconductor chip, the probes or wires from a probing pad wire will physically touch the driving wire 210. The protection wire 220 becomes inducedly changed when the driving wire 210 is probed and the circuit for preventing forgery of semiconductor chip 100 detects tampering based on the changes wire.

The control unit 120 includes a security code generation module 122, a compare module 124 and an operation control module 126. The security code generation module 122 and the compare module 124 are operably coupled between the operation control module 126 and the driving signal protection unit 110. The control unit 120 may generate first and second security codes to be compared by the compare module 124 to detect tampering. The security code may also be a single security code that's duplicated into first and second security codes. The first security code is driven to pass through the driving signal protection unit 110 and the second security code bypasses the driving signal protection unit 110. When there is physical tampering with at least one of the protection wires 220, which results in induced changes to the protection wires 220, the changes are detected when the first security code is compared to the second security code by the compare module 124.

The security code generation module 122 may generate the security code consisting of one bit or a plurality of bits. For example, when the security code generation module 122 generates the security code of one bit, the security code may correspond to [0] or [1]. Whereas, when the security code generation module 122 generates the security code consisting of the plurality of bits, the security code may correspond to [011], [0101] or [10111].

In one embodiment, the security code generation module 122 generates a fixed security code, a security code changed periodically or non-periodically. The security code generation module 122 generates the security code as a random code, a gray code, an add code, a reduce code or a cipher code based on a desired security level. The random code corresponds to a security code that periodically has a random code value. The gray code may minimize errors in operations when the security code is embodied in the gray code, as the gray code is a new code that is generated by a change of a single bit among bits consisting of at least one bit. The add code corresponds to a code that increases each bit and the reduce code corresponds to a code that decreases each bit. Also, the security code generation module 122 may generate the cipher code changing periodically or non-periodically to increase tampering detection in the semiconductor chip.

In one embodiment, the protection wire 220 is embodied in at least one wire for protecting the driving wire 210. Each of protection wires 220 respectively transmits a portion of the security code. In FIG. 2A, when the protection wire 220 is embodied in one wire, the protection wire 220-1 transmits the one-bit security code. As depicted in FIG. 2B, when the protection wire 220 is embodied in a plurality of wires, the plurality of wires 220-2 transmits a security code consisting of a plurality of bits.

In one example, the security code generation module 122 changes the type of generated security code based on a predetermined condition in the semiconductor chip while operating. For example, when the semiconductor chip is controlled by a plurality of instructions of different importance, the security code generation module 122 generates a predetermined security code for each of the instructions. In other words, the security code generation module 122 generates a fixed security code for an instruction of less importance to decrease operation quantity of the circuit for preventing forgery and generates a cipher code for instructions of more importance.

Figure 5A:
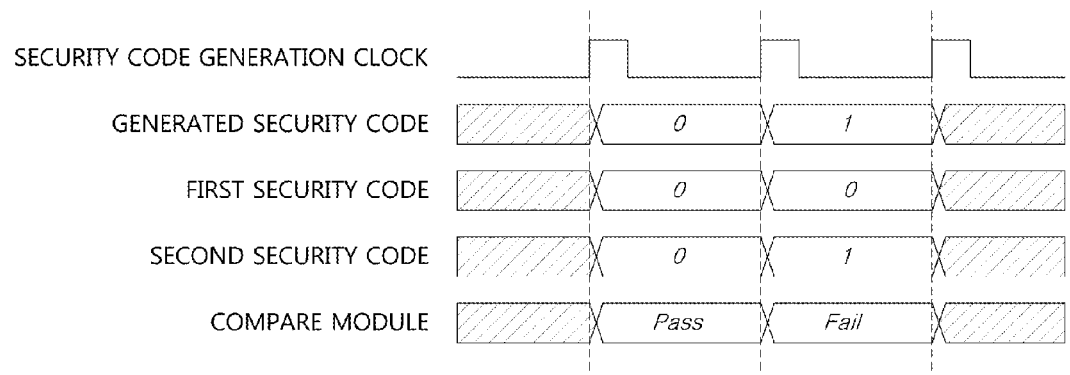
FIGS. 5A and 5B are drawings illustrating an operation of an example of a compare module when an induced change is generated in a protection wire of a driving signal protection unit.
Figure 5B:
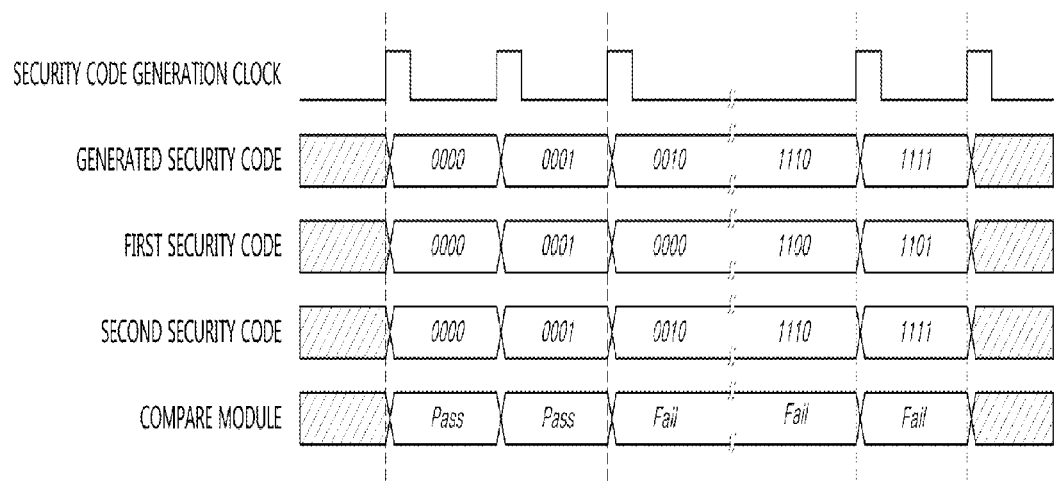
Figure 6:
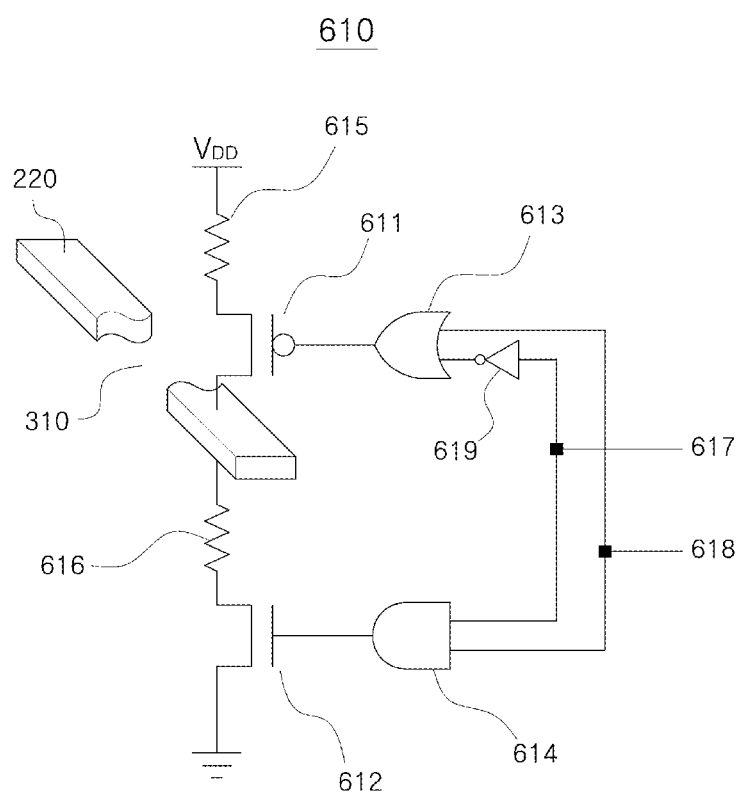
FIG. 6 is a circuit diagram illustrating an input terminal of an example of a compare module.

The compare module 124 checks whether the first and the second security codes correspond to each other. When the first and the second security codes correspond to each other, the compare module 124 determines that there is no induced change in the protection wire 220. When the first and the second security codes do not match, the compare module 124 determines that there is an induced change in the protection wire 220. That is, the compare module 124 checks whether the first and the second security codes correspond to each other to determine whether the protection wire 220 changes and provides the determination result to the operation control module 126. FIG. 4 through FIG. 6 provides a detailed operation process of the compare module 124.

The operation control module 126 may determine whether tampering is detected in the semiconductor chip based on the first and the second security codes. The operation control module 126 receive results from compare module 124 as to whether the first and the second security codes match and uses the result to control the operation of the semiconductor chip. When the first security code matches the second security code, the operation control module 126 operates the semiconductor chip in normal mode and request a new security code to be generated by the security code generation module 122. That is, the control unit 120 may generate the security code until the induced change of the protection wire 220 is detected and may repeatedly perform a process of comparing the first and the second security codes.

In one example, when the first security code does not match the second security code, the operation control module 126 performs a predetermined operation that is different from a driving signal operation. When an induced change is detected at the protection wire 220, the operation control module 126 will respond to the tamper attempt with respect to the predetermined operation currently being performed by the semiconductor chip. That is, the operation control module 126 perform an anti-tamper operation that is different from the normal operation performed by the driving signal. The anti-tamper operations obscure actual operations performed by the semiconductor chip and seek to confuse the hacker.

In another example, when the first security code does not match the second security code, the operation control module 126 stops the operation of the semiconductor chip. When the induced change is generated at the protection wire 220 due to tampering, the operation control module 126 stops the operation of the semiconductor chip to protect the driving signal from prying eyes.

The security code transformation unit 130 transforms the security code generated in the security code generation module 122. The security code transformation unit 130 provides the transformed security code to the protection wire 220 in the driving signal protection unit 110 or bypass the driving signal protection unit 110 and transmit the code directly to the compare module 124. The compare module 124 compares the first security code that is the transformed security code passing the protection wire 220 and the second security code that is the bypassed transformed security code being to detect an induced change of at least one protection wire 220. That is, the security code transformation unit 130 additionally transforms the security code generated from the security code generation module 122 to increase security of the semiconductor chip.

In FIG. 3A, the protection wire 220-1 is inducedly changed when tampered with. For example, an external subject may break 310 or damage the protection wire 220 by probing the driving wire 210. When the protection wire 220 is broken 310 or damaged, the first security code passing through the protection wire 220 will change. When the protection wire 220 is broken or damaged, the transmission process or the first security code is explained in detail in FIG. 6.

In FIG. 3B, protection wires 220-2 adjacently disposed to the driving wire 210 is shorted 320 when tampered with. When the plurality of protection wires 220-2 are shorted 320, the bit value flowing through the shorted protection wire 220-2 is changed.

Figure 4A:
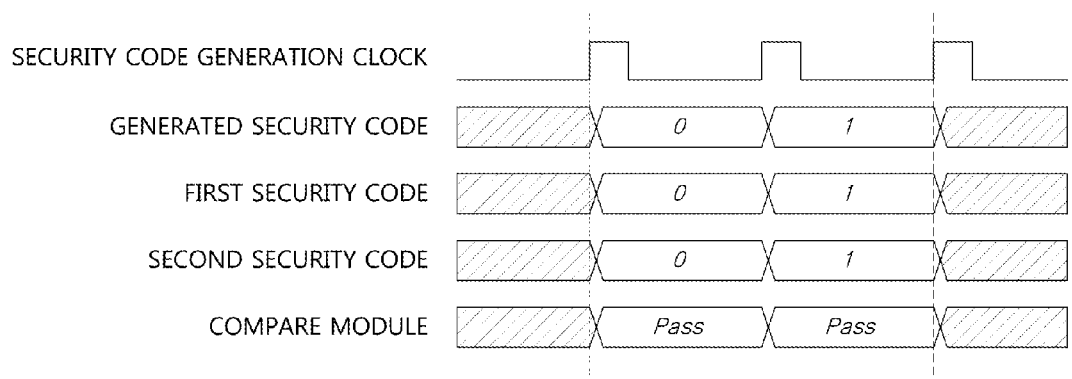
FIGS. 4A and 4B are drawings illustrating an operation of an example of a compare module.
Figure 4B:
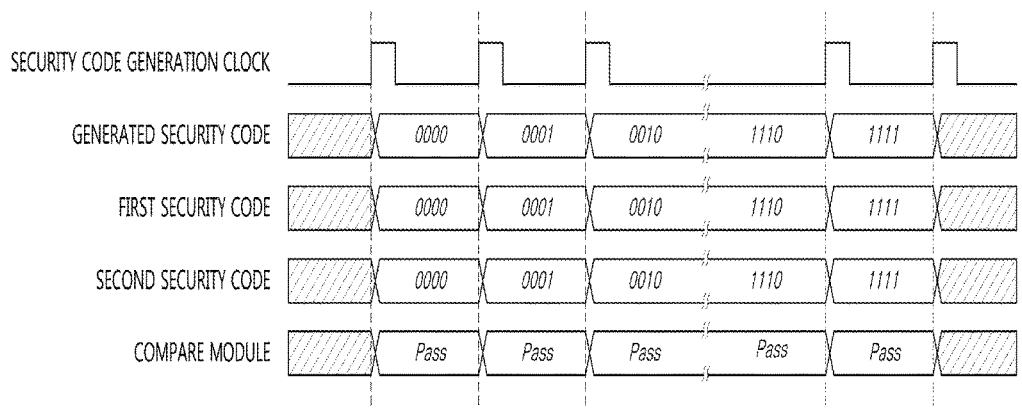

FIGS. 4A and 4B are drawings illustrating an operation of a compare module 124 in FIGS. 1A and 1B. FIGS. 5A and 5B are drawings illustrating an operation of a compare module 124 when an induced change generates changes in a protection wire of a driving signal protection unit 110 in FIG. 1.

Referring to FIG. 4A through FIG. 5B, the compare module 124 checks whether the first and the second security codes corresponds to each other to detect tampering, which results in a change of the protection wire 220.

In FIGS. 4A and 4B, when there is no induced change generated at the protection wire 220, the first security code may correspond to the security code generated in the security code generation module 122. Therefore, when there is no induced change generated at the protection wire 220, the first and the second security codes may be corresponded to each other (Pass).

In FIGS. 5A and 5B, when an induced change is generated at the protection wire 220, the first security code may have a value that is different from the generated security code. Due to the second security code being the generated security code that was bypassed, the second security code may correspond to the generated security code irrespective of the condition of the protection wire 220. As a result, when the induced change is generated at the protection wire 220, the first and the second security codes may not correspond to each other (Fail).

In one embodiment, the security code generation module 122 generates the security code every period of the security code generation clock. The generated security code is identical every period of the security code generation clock or changed periodically or non-periodically. The security code is generated by a predetermined criteria every period of the security code generation clock. For example, the security code is generated to be of a predetermined type according to the importance of a corresponding set of instructions or be generated to be a predetermined unit of bit.

FIG. 6 is a circuit diagram illustrating an input terminal of a compare module in FIG. 1.

Referring to FIG. 6, an input terminal 610 of the compare module 124 includes first and second switching elements (611, 612), an OR gate 613, an AND gate 614, first and second resistors (615, 616) and a NOT gate 619.

When an induced change is generated at the protection wire 220, the compare module 124 may prevent a leakage current and stabilize the first security code. In one embodiment, when the protection wire 220 is broken or tampered with, the input terminal 610 of the compare module 124 may prevent a generation of the leakage current. The first switching element 611 is embodied in a PMOS and the second switching element 612 is embodied in a NMOS. The first resistor 615 is embodied in a pull-up resistor to be electrically connected to the first switching element 611. The second resistor 616 is embodied in a pull-down resistor to be electrically connected with the second switching element 612.

In one embodiment, an on-off node 617 receives indication as to whether the compare module 124 is on or off. For example, when the compare module 124 is turned on, the on-off node 617 receives a positive value (high level or 1) and when the compare module 124 is turned off, the on-off node 617 receives a negative value (low level or 0). A value supplied to the on-off node 617 is provided to a first terminal of the OR gate 613 through the NOT gate 619 and provided to a first terminal of the AND gate 614.

In one embodiment, a bypass node 618 receives the bypassed second security code. The second security code supplied to the bypass node 618 is provided to the OR gate 613 and the AND gate 614.

When the induced change is generated at the protection wire, the compare module 124 assigns a value that is different from a corresponding bit of the second security code to a corresponding bit of the first security code transmitted by the changed protection wire 220.

When the compare module 124 is turned off, the positive value is supplied to the first terminal of the OR gate 613 and the OR gate 613 outputs the positive value irrespective of the value of the bypass node 618. That is, the positive value is supplied to the gate terminal of the PMOS 611 for the PMOS 611 to be turned off. Meanwhile, when the compare module 124 is turned off, the negative value is supplied to the first terminal of the AND gate 614 and the AND gate 614 may output the negative value irrespective of the value of the bypass node 618. That is, the negative value is supplied to the gate terminal of the NMOS 612, thus the NMOS 612 may be turned off.

When the compare module 124 is turned on, the negative value is supplied to the first terminal of the OR gate 613. When the compare module 124 is turned on and the positive value is supplied to the bypass node 618, the OR gate 613 outputs the positive value. That is, the positive value is supplied to a gate terminal of the PMOS 611 for the PMOS 611 to be turned off. Meanwhile, when the compare module 124 is turned on and the positive value is supplied to the bypass node 618, the AND gate 614 outputs the positive value. That is, the NMOS 612 is turned on, a broken protection wire 220 is be grounded by the pull-down resistor 616 to provide the negative value to the compare module 124. As a result, the generated security code corresponds to the positive value, however the first security code correspond to the negative value by the break 310 of the protection wire 220.

When the compare module 124 is turned on and a negative value is supplied to the bypass node 618, the AND gate 614 outputs the negative value. That is, the NMOS 612 is turned off. Meanwhile, when the compare module 124 is turned on and the negative value is supplied to the bypass node 618, the OR gate 613 outputs the negative value. That is, the PMOS 611 is turned on, power supply voltage VDD is supplied to the broken protection wire 220 by the pull-up resistor 615, thus, the broken protection wire 220 transmits the positive value to the compare module 124. As a result, the generated security code corresponds to the negative value, however the first security code corresponds to the positive value by the broken 310 of the protection wire 220.

Figure 7:
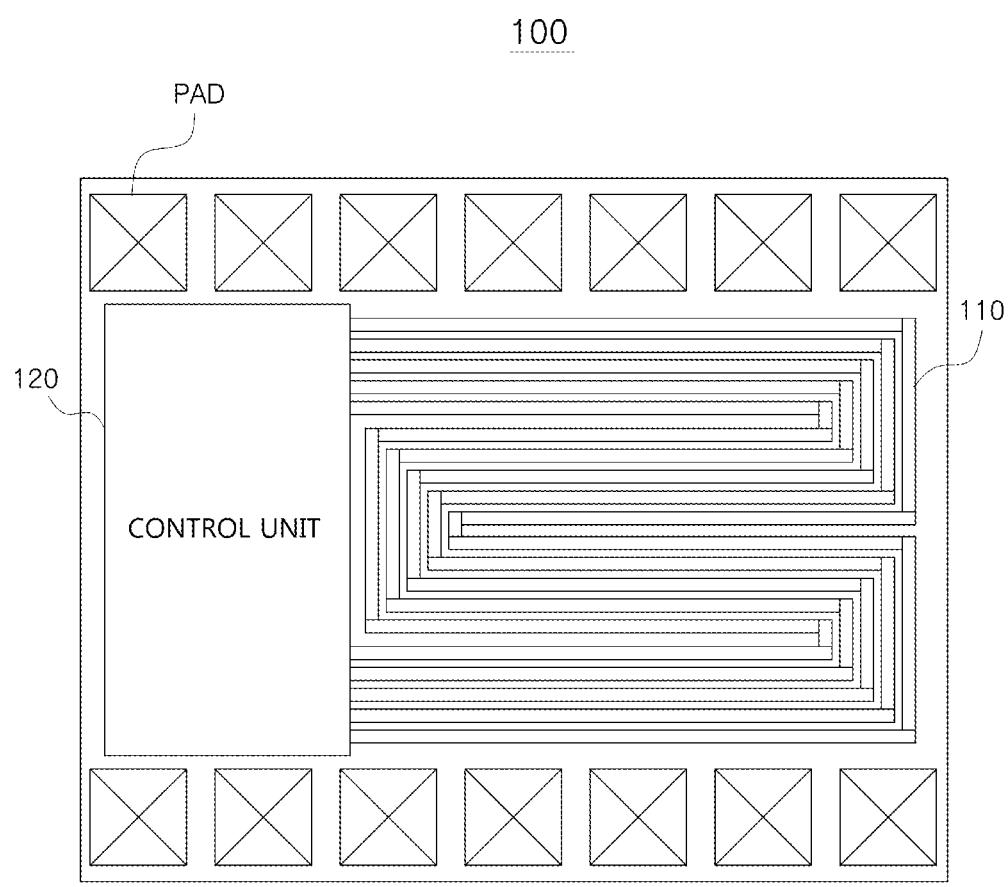
FIG. 7 is a drawing illustrating an example of a circuit for preventing forgery of semiconductor chip.

FIG. 7 is a drawing illustrating a circuit for preventing forgery of semiconductor chip embodied in one example embodiment.

Referring to FIG. 7, the circuit for preventing forgery of semiconductor chip 100 includes the driving signal protection unit 110 and the control unit 120, and may use the protection wire 220 to protect the driving wire 210. There will be security codes flowing through the protection wire 220 to prevent the forgery.

Figure 8:
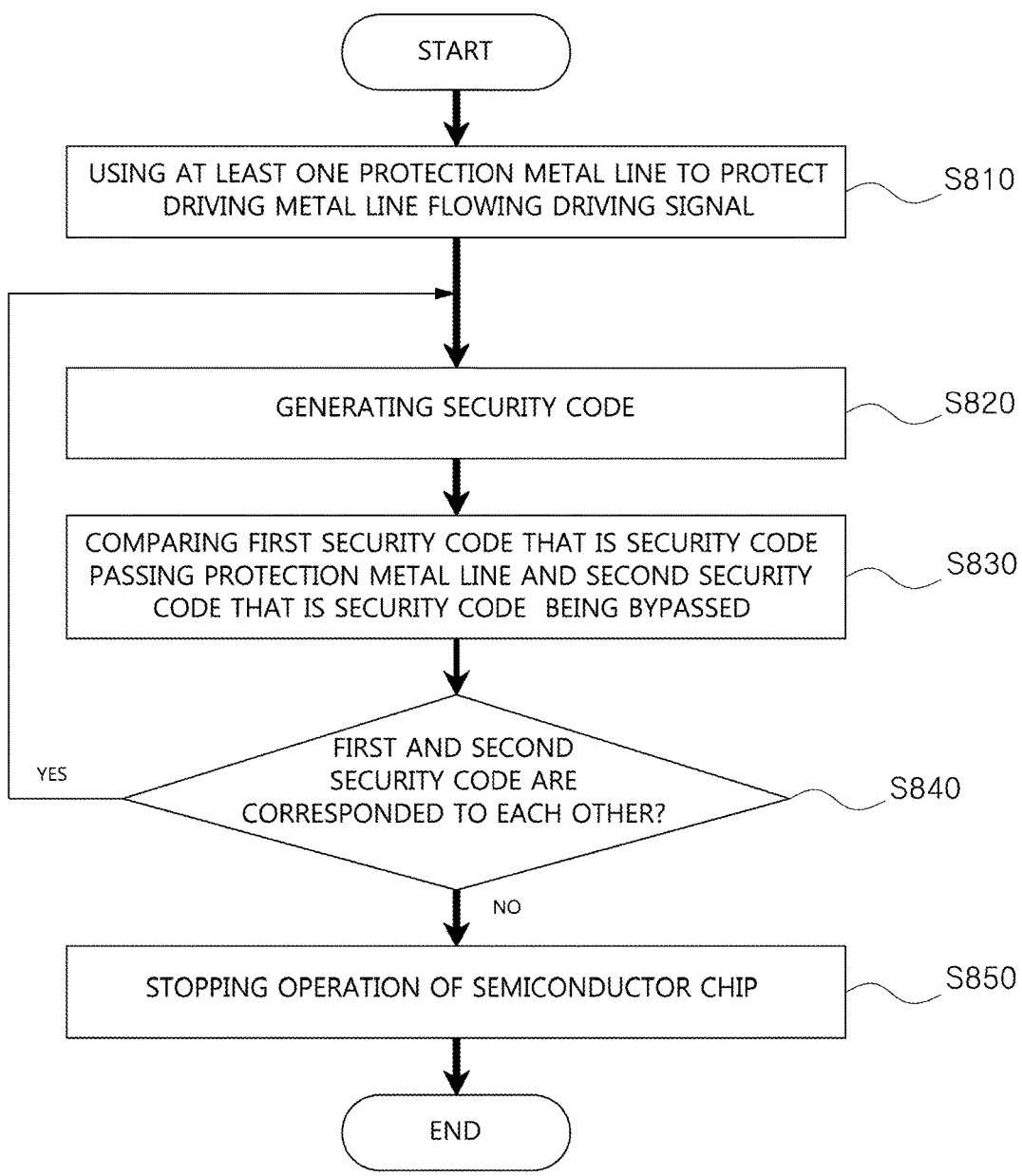
FIG. 8 is a flow chart illustrating an example of a forgery-preventing process performed on a circuit for preventing forgery of semiconductor chip.

FIG. 8 is a flow chart illustrating an example of a forgery-preventing process performed on a circuit for preventing forgery of semiconductor chip in FIG. 1.

The driving signal protection unit 110 uses at least one protection wire 220 to protect the driving wire 210 that the driving signal flows through (step S810).

The security code generation module 122 generates the security code consisting of at least one bit. The security code generation module 122 may generate a fixed security code or a security code that changes periodically or non-periodically (step S820).

The compare module 124 compares the first security code that passed through the protection wire 220 and the second security code that bypasses the driving signal protection unit 110 to detect the presence of an induced change at the protection wire 220 (step S830).

When the first security code matches the second security code, the operation control module 126 is operated in a normal mode and may order a new security code to be generated by the security code generation module 122 (step S840).

When the first security code does not match the second security code, the operation control module 126 halts the operation of the semiconductor chip (step S850).

Figure 9:
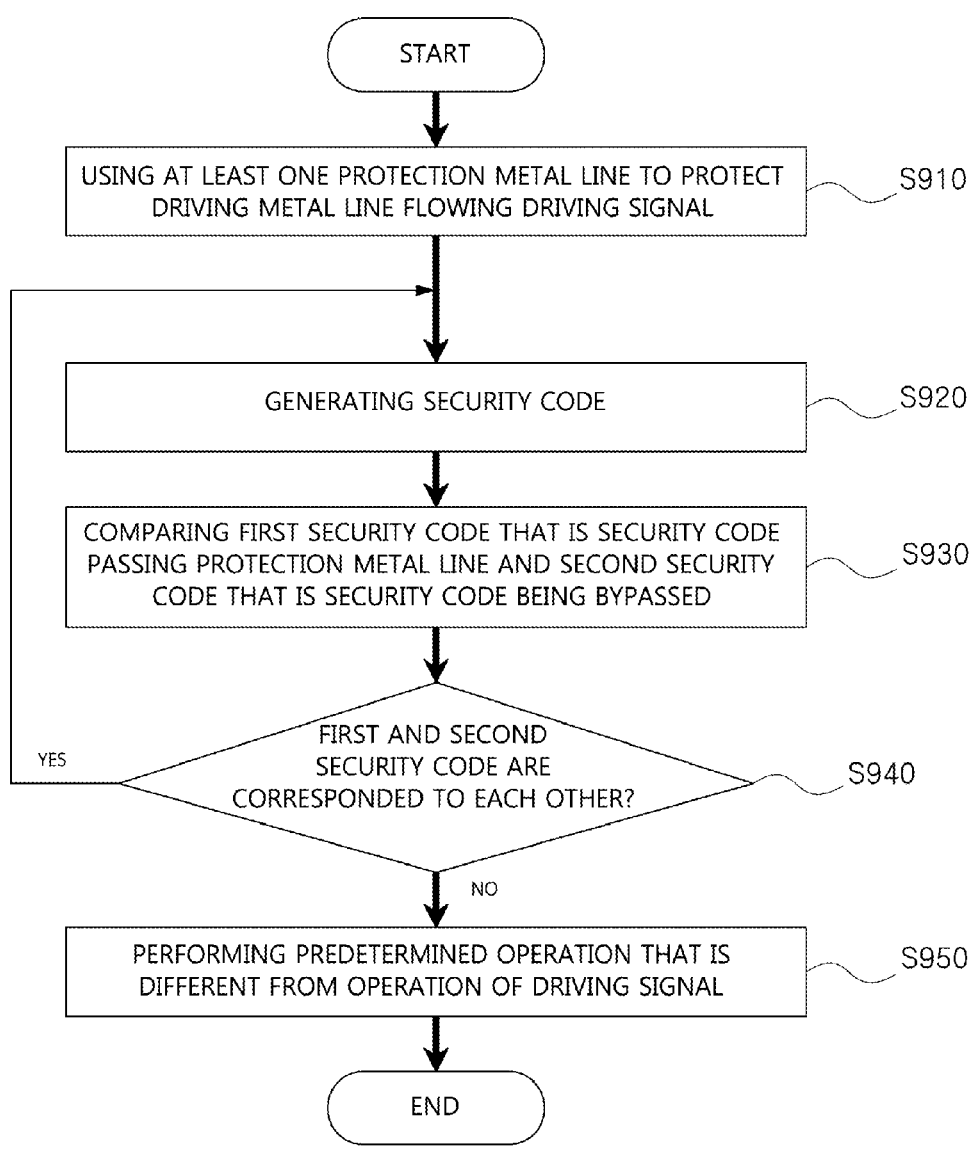
FIG. 9 is a flow chart illustrating another example of an operation control module of a forgery-preventing process performed on a circuit for preventing forgery of semiconductor chip.

FIG. 9 is a flow chart illustrating another example of the operation control module 126 of a forgery-preventing process performed in a circuit for preventing forgery of semiconductor chip in FIG. 1.

The driving signal protection unit 110 uses at least one protection wire 220 to protect the driving wire 210 that the driving signal flows through (step S910).

The security code generation module 122 generates a security code consisting of at least one bit. The security code generation module 122 may generate a fixed security code or a security code that changes periodically or non-periodically (step S920).

The compare module 124 compares the first security code that is the generated security code passing the protection wire 220 and the second security code that bypasses the driving signal protection unit 110 to detect the presence of an induced change at the protection wire 220 (step S930).

When the first security code matches the second security codes, the operation control module 126 is operated in a normal mode and may order a new security code to be generated by the security code generation module 122 (step S940).

When the first security code does not match the second security code, the operation control module 126 performs a predetermined operation that is different from an operation by the driving signal (step S950) in a normal mode of operation.

Therefore, the circuit for preventing forgery of semiconductor chip 100 uses the protection wire 220 protecting the driving wire 210 and the security code flowing into the protection wire 220 to detect tampering and prevent the forgery of the semiconductor chip.

In an example, the circuit for preventing forgery of semiconductor chip 100 will not use the sensor unit to acquire the surrounding environment data and the storage unit to store the surrounding environment data of the semiconductor chip so as to decrease the area of the semiconductor chip and improve the cost.

The apparatuses, units, modules, devices, and other components illustrated in FIGS. 1A through 3B that perform the operations described herein with respect to FIGS. 1A through 3B are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1A through 3B. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 8 and 9 that perform the operations described herein with respect to FIGS. 1A through 2B are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A circuit for preventing forgery of a semiconductor chip, comprising:

a driving signal protection circuit portion comprising at least one protection wire for protecting a driving wire through which a driving signal of the semiconductor chip flows; and a controller configured to:

generate a first security code and a second security code;

check whether the first security code that passes through the driving signal protection circuit portion and the second security code that bypasses the driving signal protection circuit portion correspond to each other to detect tampering at the at least one protection wire; and control implementation of an operation of the semiconductor chip, wherein, in response to a protection wire of the at least one protection wire being changed, the controller is further configured to assign a value to a corresponding bit of the first security code that is different from a corresponding bit of the second security code.

2. The circuit of claim 1, wherein the controller is configured to generate a security code comprising at least one bit.

3. The circuit of claim 1, wherein the controller is configured to check whether the first and second security codes match.

4. The circuit of claim 1, wherein the controller is further configured to prevent a leakage current, and wherein the changed protection wire of the at least one protection wire comprises a broken or tampered protection wire.

5. The circuit of claim 1, wherein the controller is configured to assign a logic low value to the corresponding bit of the first security code by electrically connecting the changed protection wire to a ground voltage in response to the corresponding bit of the second security code being a logic high value.

6. The circuit of claim 1, wherein the controller is configured to assign a logic high value to the corresponding bit of the first security code by electrically connecting the changed protection wire to a power supply voltage in response to the corresponding bit of the second security code being a logic low value.

7. The circuit of claim 1, wherein, for the control of the semiconductor chip, the controller is configured to determine whether the semiconductor chip operates based on the first and second security codes.

8. The circuit of claim 7, wherein the controller performs a predetermined operation that is different from an operation implemented by the driving signal when the first and second security codes do not match.

9. The circuit of claim 7, wherein the controller stops the implemented operation of the semiconductor chip when the first and second security codes do not match.

10. The circuit of claim 1, wherein the at least one protection wire is disposed adjacent to the driving wire.

11. The circuit of claim 2, wherein the controller generates the security code such as a random code, a gray code, an add code, a reduce code or a cipher code according to a desired level of security.

12. The circuit of claim 11, wherein the controller changes a type of the generated security code based on a predetermined condition while the semiconductor chip operates.

13. The circuit of claim 2, wherein the controller is further configured to transform the generated security codes and provide the transformed security codes to the protection wire.

14. A method for preventing forgery of a semiconductor chip, the method comprising:

using at least one protection wire to protect a driving wire through which a driving signal of the semiconductor chip flows;

generating, by a controller, a first security code and a second security code;

checking, by the controller, whether the first security code passing through the at least one protection wire and the second security code bypassing the at least one protection wire correspond to each other to detect tampering that causes an induced change in the at least one protection wire; and controlling, by the controller, implementation of an operation of the semiconductor chip based on a result of the checking, wherein, in response to a protection wire of the at least one protection wire being changed, the controller being configured to electrically connect the changed protection wire to either a ground voltage or a power supply voltage so as to assign a value to a corresponding bit of the first security code that is different from a corresponding bit of the second security code.

15. The method of claim 14, further comprising:
transforming the generated first and second security codes, and
providing the transformed first security code to the at least one protection wire and bypassing the transformed second security code.

16. A circuit for preventing forgery of a semiconductor chip, comprising:
a controller configured to:
control an operation of the semiconductor chip; and
generate a security code and copies of the security code; and
a driving signal protection circuit portion comprising protection wires and driving wires carrying data, the driving signal protection circuit portion receiving a first copy of the security code from the controller, and a second copy of the security code driven to bypass the driving signal protection circuit portion, wherein the controller is further configured to:
in response to a protection wire of the protection wires being changed, assign a value to a corresponding bit of the first copy of the security code that is different from a corresponding bit of the second copy of the security code, and
check whether the first copy of the security code from the driving signal protection circuit portion and the second copy of the security code from the controller correspond to each other to detect tampering in response to the first copy of the security code not matching the second copy of the security code.

17. The circuit of claim 16, wherein the controller is configured to:
assign a logic low value to the corresponding bit of the first copy of the security code by electrically connecting the changed protection wire to a ground voltage in response to the corresponding bit of the second copy of the security code being a logic high value, and
assign a logic high value to the corresponding bit of the first copy of the security code by electrically connecting the changed protection wire to a power supply voltage in response to the corresponding bit of the second copy of the security code being a logic low value.

18. The circuit for preventing of the semiconductor chip of claim 16, wherein each of the protection wires is configured to break when physically touched.

19. The circuit for preventing of the semiconductor chip of claim 18, wherein the protection wires are disposed around the driving wires.

* * * * *